Figures 1, 2, 3:
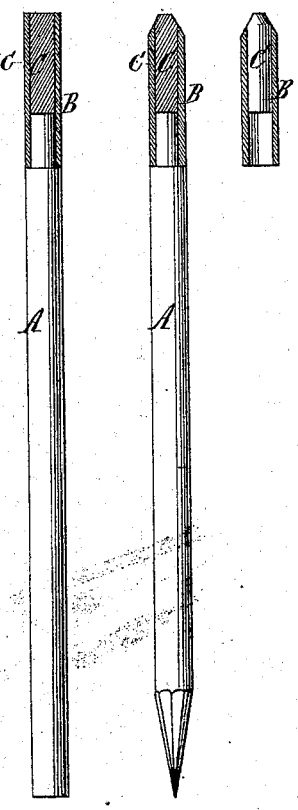

P. HUFELAND.

Lead-Pencils.

No. 136,122.

Patented Feb. 18, 1873.

Witnesses.
E. F. Kastenhuber
Ernst Bilhuber.

Inventor.
Ph. Hufeland
per
Van Santvoord & Hauff
Attys

UNITED STATES PATENT OFFICE.

PHILIP HUFELAND, OF NEW YORK, N. Y.

IMPROVEMENT IN LEAD-PENCILS.

Specification forming part of Letters Patent No. 136,122, dated February 18, 1873.

*To all whom it may concern:*

Be it known that I, PHILIP HUFELAND, of the city, county, and State of New York, have invented a new and useful Improvement in Lead-Pencils; and I do hereby declare the following to be a full, clear, and exact description thereof, which will enable those skilled in the art to make and use the same, reference being had to the accompanying drawing forming part of this specification, in which drawing—

Figures 1 and 2 represent sectional side views of this invention as applied to a lead-pencil ready for use. Fig. 3 is a side view of the rubber-holder detached.

Similar letters indicate corresponding parts.

This invention consists in combining with a lead-pencil a tube made of paper, cloth, or other flexible material which is soft enough to be cut with a knife, and can easily be attached to a lead-pencil, said tube containing a piece of India rubber, which it incases entirely or nearly so, in such a manner that a cheap, light, and durable rubber attachment to lead-pencils is obtained, which has the great advantage that the tube inclosing the rubber must be cut away as the rubber wears off, and said rubber can be used up entirely in the same manner as the lead, and at the same time the casing of the rubber is not liable to split as it is if the same is made of wood.

In the drawing, the letter A designates an ordinary lead-pencil with a wooden case. To one end of this pencil I attach a tube, B, made of paper, cloth, leather, or other flexible material soft enough to be cut with a knife, and capable of being readily formed in a tube of the proper diameter to fit the end of the pencil. In this tube I secure a piece of India rubber, C, and when the tube has been attached to the pencil I cut off the end of the tube, so that the rubber protrudes therefrom a sufficient distance to be used as an eraser.

As the rubber wears off the tube can be easily cut down so as to keep the end of the rubber always exposed, and thereby I am enabled to use the rubber clear down to its inner end. This property of my tube of paper, cloth, leather, or other flexible material of a similar nature, is of great advantage over the metal casings generally used for rubber attachments to pencils. Furthermore, my tube is superior to a wooden casing for rubber, because it can be made very light, and yet it is not liable to split, and the material which I use in the manufacture of my tubes allows of making said tubes cylindrical or polygonal, to adapt it to the shape of the pencil.

In most cases the outside diameter of my paper tube will be made equal to the outside diameter of the pencil, and the end of the pencil will be worked down so that it can be introduced into the tube, leaving the surface of the pencil with its rubber attachment unbroken throughout.

I am aware that India rubber has been combined with a lead-pencil in various different ways, such, for instance, as shown in the patent of H. Lipman, No. 19,783, (1858,) where the rubber is inclosed in the wooden case of the pencil; or in the patent of Vosburgh and Ludden, No. 35,355, (1862,) and reissue No. 3,683, (1869,) in which a metallic clamp is shown, to connect the rubber with the end of the pencil; or in the patent of J. B. Hodgskin, No. 46,358, (1865,) in which a metal tube is used which contains the rubber in one end, and the other end of which can be slipped over the pencil; but I have been unable to find a tube connecting the rubber to a pencil, which is made of paper, or other flexible and tough material not liable to split, and yet capable of being cut with a knife as the rubber wears so as to expose a fresh portion of the same.

I disclaim the devices shown and described in the above-named patents of Lipman, of Vosburgh and Ludden, and of Hodgskin; neither do I claim broadly as my invention a lead-pencil and India-rubber eraser of corresponding form, which are united end to end by a paper tube; neither do I claim a lead-pencil having a paper case or tube applied to its end, so as to have its exterior surface flush with the exterior of the pencil-body, and colored or finished to correspond with the body of the pencil, as such is the subject-matter of another application; but

What I claim, and desire to secure by Letters Patent, is—

A lead-pencil having attached to one of its ends a tube of paper, leather, cloth, or other tough and flexible material, forming a continuation of the pencil, and containing a piece of India rubber, which it incloses entirely, or nearly so, so that it must be cut away to expose the rubber for use, substantially in the manner herein shown and described.

This specification signed by me this 24th day of April, 1871.

PH. HUFELAND.

Witnesses:
W. HAUFF,
E. F. KASTENHUBER.